United States Patent [19]

Hsu et al.

[11] Patent Number: 4,927,662

[45] Date of Patent: May 22, 1990

[54] TREATMENT OF POWDERED CELLULOSE

[75] Inventors: Jau Y. Hsu, Brookfield; Gary J. Larson, New Milford, both of Conn.

[73] Assignee: Nestec S.A., Vevey, Switzerland

[21] Appl. No.: 214,910

[22] Filed: Jun. 28, 1988

Related U.S. Application Data

[63] Continuation of Ser. No. 857,109, Apr. 29, 1986, abandoned, which is a continuation of Ser. No. 528,562, Sep. 1, 1983, abandoned, which is a continuation of Ser. No. 313,906, Oct. 22, 1981, abandoned, which is a continuation of Ser. No. 170,089, Jul. 18, 1980, abandoned.

[51] Int. Cl.$^5$ .......................... A23L 1/10; A23L 1/015
[52] U.S. Cl. ..................................... 426/658; 426/615; 426/640
[58] Field of Search ............... 426/658, 640, 615, 463, 426/661, 804, 96, 93, 472, 457, 459, 460, 472, 486

[56] References Cited

U.S. PATENT DOCUMENTS

| | | | |
|---|---|---|---|
| 897,854 | 9/1908 | Schluter | 426/463 |
| 1,189,130 | 6/1916 | Kellogg | 426/463 |
| 2,009,274 | 7/1935 | Quaschning et al. | 426/463 |
| 2,026,676 | 1/1936 | Gill | 426/460 |
| 3,023,104 | 2/1962 | Battista | 426/804 |
| 3,360,374 | 12/1967 | Barr | 426/615 |
| 3,573,058 | 3/1971 | Tiemstra | 426/804 |
| 3,574,634 | 4/1971 | Singer | 426/62 |
| 4,042,719 | 8/1977 | Zimmerman et al. | 426/804 |
| 4,089,981 | 5/1978 | Richardson | 426/804 |
| 4,109,018 | 8/1978 | Thompson | 426/804 |
| 4,143,163 | 3/1979 | Hutchison et al. | 426/804 |
| 4,219,580 | 8/1980 | Torres | 426/658 |

FOREIGN PATENT DOCUMENTS

| | | | |
|---|---|---|---|
| 1959196 | 6/1971 | Fed. Rep. of Germany | 426/804 |
| 2729370 | 1/1978 | Fed. Rep. of Germany | 426/804 |

OTHER PUBLICATIONS

Condensed Chem. Digt., 8th Ed., pp. 420, 421, Van Nostran Reinhold, 1971.
The American College Dictionary, Random House, 1970.
Fenaroli's Hndbk of Flavor Ingredients, Copy in Grf., 130, vol. I & II, 1975, 2nd Ed., Furia et al., CRC Press.
Food Products, Blumenthal, Chem. Publ. Co., 1947, pp. 4 & 124.
Chemistry & Industry, 10/19/28, p. 1077.

*Primary Examiner*—Steven Weinstein
*Attorney, Agent, or Firm*—Vogt & O'Donnell

[57] ABSTRACT

Powdered cellulose is treated by combining it with a flavoring agent and from 25 to 75 parts by weight of water per 100 parts by weight of powdered cellulose, which is an amount of water sufficient to wet substantially all of the cellulose, mixing the whole and then heating the mixture to remove most of the water from the treated cellulose. A gelling agent also advantageously is combined with the powdered cellulose, flavoring agent and water before mixing the whole and then removing the water.

13 Claims, No Drawings

TREATMENT OF POWDERED CELLULOSE

CROSS REFERENCE TO RELATED APPLICATIONS

This is a continuation application of co-pending application Ser. No. 06/857,109, filed Apr. 29, 1986, now abandoned, which is a continuation of Ser. No. 06/528,562, filed on Sept. 1, 1983, now abandoned, which is a continuation of Application Ser. No. 06/313,906, filed on Oct. 22, 1981, now abandoned, which is a continuation of Application Ser. No. 06/170,089 filed on July 18, 1980, now abandoned.

BACKGROUND OF THE INVENTION

The present invention relates to a process for the production of a low calorie cellulose food filler with an improved flavour or texture, more particularly a powdered cellulose food filler.

In the preparation of low calorie foods the general method is to reduce the proportion of carbohydrate and fat in the food. However, if the carbohydrate and fat content were reduced without adding a substitute, there would be a reduction of bulk volume and change of texture of the food product. Therefore a bulking agent with a low calorie content is needed to provide the bulk volume and reduce the caloric density of the food. The bulking agents are known as low calorie fillers.

Fat and oil may be replaced by recently developed fillers such as sucrose polyester and polyglycerol esters which have the characteristics of oil and fat but have a much lower calorie content.

Carbohydrate may be replaced by two types of filler, one being a soluble material for replacing sugar and the other being an insoluble material for replacing starch and flour. The most common materials used for replacing starch and flour are dietary fibres or the so-called "unavailable" carbohydrates, examples of which are pectic substances, gums, mucilages, hemicellulose, cellulose and lignins. Of these materials, purified cellulose is most effective because of its high fibre content, good shelf life and negligible levels of microbial contamination. There are two purified celluloses available commercially, these being powdered cellulose and microcrystalline cellulose of which powdered cellulose is the most used in low calorie foods because of its lower cost. However, there are two major disadvantages of powdered cellulose when used in foods. One is that it possesses an undesirable cardboard taste and odour and the second is that it has a very gritty texture after rehydration. Because of the undesirable taste and odour, the palatability of foods containing powdered cellulose has always been a problem and this has meant that only a limited amount of powdered cellulose could be used not only in low calorie foods but also in high fibre foods such as breakfast cereals in which calorie reduction is not necessary but addition of fibre content is beneficial. This undesirable taste and odour is most significant when the powdered cellulose is used in instant foods which require minimum or no cooking.

It is common practice to add flavouring ingredients to powdered cellulose but this only masks or neutralises the cardboard taste and odour of the cellulose. For example, U.S. Pat. No. 4,089,981 describes a process for making simulated foods by adding flavouring agent, gelling agent, oil and water to the cellulose with mild temperature pasteurisation at 165° F., but the flavour of the cellulose itself is not altered.

Summary of the Invention

In a first embodiment of this invention we have found surprisingly that by mixing powdered cellulose with water and a flavouring ingredient and then heating the mixture to remove water, the undesirable taste and odour of the cellulose is substantially removed and a more pleasant flavour is obtained.

With regard to the gritty texture of powdered cellulose, efforts have been made to eliminate it by adding gelling agents such as cellulose gums, pectins, alginates and starches to the cellulose to provide a cohesive gel-like texture and smooth mouthfeel. However the addition of large amounts of gelling agents causes lumpiness when the mixture is rehydrated leading to poor dispersibility. In a second embodiment of the invention we have found surprisingly that by mixing powdered cellulose with water and a gelling agent and then heating the mixture to remove water the grittiness of the cellulose is substantially eliminated without any lumpiness, thus providing the mixture with a good dispersibility.

Accordingly the present invention providesa process of treating a powdered cellulose food filler which comprises mixing powdered cellulose, and either flavouring agent or gelling agent or both, with water in an amount sufficient to wet substantially all the cellulose powder, and afterwards heating the mixture to remove most of the water.

DETAILED DESCRIPTION OF THE INVENTION

The amount of water mixed with the powdered cellulose depends on the type of cellulose and the water absorption of the cellulose. Less water is required to wet fine cellulose than coarse cellulose. The principle is to wet all or substantially all the powdered cellulose. This can conveniently be achieved by mixing from 25 to 75 parts by weight and preferably from 40 to 60 partsby weight of water with 100 parts by weight of powdered cellulose.

The amount of flavouring agent mixed with the powdered cellulose depends on the amount of the treated powdered cellulose used, on the type of food product into which it is incorporated and on the type of flavouring agent itself. The amount may vary from 0.05 to 10 parts by weight per 100 parts by weight of cellulose. The amount of flavouring agent that is preferred is the amount which gives an optimum use level in the treated cellulose. For example, if the flavour is too strong it is not desirable to add too much of the treated cellulose powder to foods. Generally, the amount of flavouring agents such as cysteine and thiamine are from 0.1 to 1.0 parts by weight and preferably from 0.2 to 0.5 parts by weight per 100 parts by weight of powdered cellulose. Other types of flavouring agent such as beef extract, yeast extract, cheese powder, egg yolk powder and cocoa powder are generally used in amounts of from 0.5 to 10 parts by weight and preferably from 1 to 5 parts by weight per 100 parts by weight of powdered cellulose.

The amount of gelling agent may be from 1 to 15 parts by weight, preferably from 3 to 10 parts by weight per 100 parts by weight of powdered cellulose. The gelling agent may be a cellulose gum, a pectin, an alginate or a starch.

Preferably the mixture of powdered cellulose, flavouring agent or gelling agent or both, and water is mixed thoroughly until uniform before being heated. This mixing may conveniently be carried out in a high shear mixer such as a Lodige or turbulent mixer.

The heating temperature and the time of the heat treatment are related to the amount of water added. Conveniently temperatures from 70° C. to 160° C. may be used, preferably from 90° C. to 150° C. The heating time may vary, for example, from 15 minutes to 2 hours, shorter heating times being adequate at higher temperatures.

The heating can be carried out in any drying device that contacts and stirs the product. The water is removed until the moisture content of the treated cellulose powder is less than 10% preferably less than 5%. A vacuum evacuation system may be used ot evaporate the added water.

In a preferred embodiment of the invention, both the flavouring agent and the gelling agent may be mixed with the powdered cellulose and water and the mixture afterwards heated to remove most of the water. The treated cellulose powder than has not only an improved flavour but also an improved texture.

The treated cellulose powder may be used in two types of applications:
(a) As a substitute for carbohydrate in foods to reduce calories and provide bulk volume, e.g., to replace dehydrated potato in mashed potato mix.
(b) As a fibre source in foods in which calorie reduction is not necessary but addition of fibre content is beneficial, e.g., addition of fibre to hot breakfast cereal.

The present invention also provides a foodstuff to which has been added a powdered cellulose filler treated as hereinbefore described. Examples of such foodstuffs are mashed potato mix, sauce mix and instant cream of wheat.

The process of the present invention has the following advantages:
1. It enables a greater quantity of powdered cellulose to be added to foods as a high fibre, low calorie filler.
2. It imparts a better flavour to the powdered cellulose.
3. It allows usage of the powdered cellulose in a larger variety of foods.
4. It improves the texture of the powdered cellulose without causing lumpiness on rehydration and thus provides a powdered cellulose with good dispersibility. Gums added to the cellulose after treatment with a gelling agent in accordance with this invention have a better dispersibility than gums added to the cellulose which has not been so treated.
5. The powdered cellulose has a better wetting quality.

The following Examples further illustrate the present invention in which parts are given by weight.

EXAMPLE 1

To 98.5 parts of powdered cellulose, 1.5 parts of yeast extract powder and then 50 parts of water were added and the whole was mixed in a turbulent high shear mixer until uniform. The wet premix was fed into a Wyssmont Turbo K-10 unit dryer at a rate of 50 pounds per hour and heated for 30 minutes at 150° C. until the moisture content was below 7%.

Test Method

To demonstrate the advantage of the present invention 40 parts of water were added to 10 parts of each of (a) cellulose; (b) cellulose and yeast extract combined and mixed in amounts in accordance with the present invention; (c) cellulose combined with water in amounts in accordance with the present invention and then mixed and then heated to remove most of the water; (d) cellulose and yeast extract and water combined in amounts in accordance with the present invention and then mixed and then heated to remove most of the water as in the process of the present invention. The results are given in the following Table I.

TABLE I

| | CELLULOSE | | CELLULOSE/YEAST EXTRACT | |
|---|---|---|---|---|
| | without treatment | with treatment | without treatment | with treatment |
| Cellulose odour | existing | none | existing | none |
| flavour | cardboard | slight cardboard | slight cardboard | pleasant roast note |

It is clear that treatment of the cellulose/yeast extract in accordance with the present invention produces a powdered cellulose with no odour and a pleasant flavour.

EXAMPLES 2 TO 8

A similar procedure to that described in Example 1 was followed but employing, instead of the yeast extract, the flavouring agents listed in the following Table II in the amounts designated. The amounts of cellulose used and the flavour characteristics produced are also specified in the Table.

TABLE II

| Example | Flavouring Agent (Parts) | Parts of Cellulose | Flavour characteristics |
|---|---|---|---|
| 2 | Beef extract (3.0) | 97.0 | Beefy |
| 3 | Cysteine HCl (0.2) | 99.8 | Roast |
| 4 | Thiamine HCl (0.2) | 99.8 | Roast |
| 5 | Egg Yolk Powder (3.0) | 97.0 | Chicken Type |
| 6 | Romano Cheese Powder (2.0) | 98.0 | Dairy |
| 7 | Cocoa Powder (3.0) | 97.0 | Cocoa |
| 8 | Hydrolysed Plant Protein (2.5) | 97.5 | Meaty |

EXAMPLE 9

To 95 parts of powdered cellulose, 5 parts of cellulose gum and then 60 parts of water were added and the whole was mixed in a turbulent high shear mixer until uniform. The wet premix was fed into a Wyssmont Turbo K-10 unit dryer at a rate of 50 pounds per hour heated for 30 minutes at 150° C.until the moisture content was below 7%.

Test Method

To demonstrate the advantage of the present invention 40 parts of water were added to 5 parts of (a) cellulose and cellulose gum combined in amounts in accordance with the present invention and then mixed, and (b) cellulose and cellulose gum and water combined in amounts in accordance with the present invention and then mixed and then heated to remove most of the water as in the present invention. The results are shown in Table III below.

TABLE III

| | CELLULOSE/CELLULOSE GUM | |
|---|---|---|
| | Without treatment | With treatment |
| Texture and mouthfeel | not gritty but lumpy | smooth and not lumpy |
| Dispersibility | poor | good |

It is clear that a cellulose/cellulose gum mixture treated in accordance with the present invention has a superior texture and superior dispersibility to an untreated mixture.

EXAMPLE 10

97.5 parts of powdered cellulose, 2.5 parts of hydrolysed plant protein powder and 35 parts of water were mixed in a mixer with heating jacket and vacuum evacuation system. The mixture was heated at 90° C. for 90 minutes and dried till the moisture content was 5%.

EXAMPLE 11

To 95.5 parts of powdered cellulose, 1.5 parts yeast extract powder and 3 parts cellulose gum were added 50 parts of water and the whole was mixed in a turbulent high shear mixer until uniform. The wet premix was fed into a Wyssmont Turbo K-10 unit dryer at a rate of 50 pounds per hour and heated for 30 minutes at 150° C. until the moisture content was below 7%.

The treated powdered cellulose had a pleasant roast flavour note and a smooth texture after it was rehydrated.

EXAMPLE 12

To produce a reduced calorie mashed potato 15 g of 76 g potato flake was replaced by 15 g of the cellulose powder treated as in Example 11 and rehydrated with 300 ml hot water and 100 ml milk.

Test Method

To demonstrate the advantages of a mashed potato produced in accordance with the present invention 76 g of a control potato was compared with 61 g of a potato to which was added 14.3 g of non-treated powdered cellulose and also 61 g of a potato to which was added 15 g of a powdered cellulose treated as in Example 11. The results are given in Table IV below.

TABLE IV

| | RECONSTITUTED MASHED POTATO | | |
|---|---|---|---|
| | Control potato | Potato + non-treated cellulose | Potato and treated cellulose |
| Flavour characteristic | potato | cardboard | cooked potato |
| Texture | smooth | grainy and dry | smooth |
| Calorie content | 346 cal. | 291 cal. | 292 cal. |

This demonstrates that a mashed potato containing a powdered cellulose filler treated in accordance with the present invention contains fewer calories than an ordinary mashed potato and has a superior flavour and texture to a potato containing a non-treated powdered cellulose filler.

EXAMPLE 13

To prepare a high fibre instant cream of wheat 98 parts of powdered cellulose were premixed with 2 parts Romano Cheese Powder. 50 parts of water were added and the whole was mixed in a turbulent high shear mixer until uniform. The wet premix was fed into a Wyssmont Turbo K-10 unit dryer at a rate of 50 pounds per hour and heated for 30 minutes at 150° C. until the moisture content was below 7%. The treated cellulose powder had a pleasant dairy note.

7 g of this treated powdered cellulose was premixed with 30 g instant cream of wheat mix and 12 g of sugar. The mixture was sprinkled into 200 ml of milk, brought to the boil and cooked for 30 seconds. The differences between regular cream of wheat, cream of wheat containing non-treated cellulose and cream of wheat containing powdered cellulose treated in accordance with the present invention are given in Table V below.

TABLE V

| | RECONSTITUTED CREAM OF WHEAT | | |
|---|---|---|---|
| | Regular cream of wheat | Cream of wheat and non-treated cellulose | Cream of wheat and treated cellulose |
| Flavour characteristic | good | slight cardboard | pleasant dairy note |
| Crude fibre | 0.5 g | 6.1 g | 6.1 g |

This demonstrates that cream of wheat containing powdered cellulose treated in accordance with the present invention not only has a higher fibre content than regular cream of wheat but also a much more pleasant flavour than wheat containing a non-treated powdered cellulose.

We claim:

1. A process for treating powdered cellulose which comprises combining powdered cellulose, a flavoring agent and water, wherein, by weight, the wate is in an amount of from 25 to 75 parts per 100 parts of powdered cellulose, and mixing the cellulose, flavoring agent and water to provide a mixture in which substantially all of the cellulose is wetted and then heating the mixture to remove most of the water.

2. A process as claimed in claim 1 further comprising combining a gelling agent with the powdered cellulose, flavoring agent and water and mixing the gelling agent, cellulose flavoring agent and water to provide the mixture in which substantially all of the cellulose is wetted.

3. A process as claimed in claim 2 in which the gelling agent is combined in an amount of from 3 to 10 parts per 100 parts of powdered cellulose by weight.

4. A process as claimed in claim 1 or claim 2 wherein the water is combined in an amount of from 40 to 60 parts per 100 parts of powdered cellulose by weight.

5. A process as claimed in claim 1 or claim 2 wherein the flavoring agent is selected from the group consisting of cysteine and thiamine and is combined in an amount of from 0.1 to 1.0 parts per 100 parts of powdered cellulose by weight.

6. A process as claimed in claim 1 or claim 2 in which the combinatino is mixed thoroughly to prepare a uniform mixture before heating the mixture.

7. A process as claimed in claim 1 or claim 2 in which the mixture is heated at a temperature of from 90° C. to 150° C. to obtain a moisture content of less than 10%.

8. A process as claimed in claim 1 or claim 2 wherein the flavoring agent is selected from the group consisting of beef extract, yeast extract, cheese powder, egg yolk powder and cocoa powder and is combined in an amount of from 0.5 to 10 parts per 100 parts of powdered cellulose by weight.

9. The product produced by the process of claim 1 or claim 2.

10. A process for treating powdered cellulose consisting essentially of combining powdered cellulose, a flavoring agent and water, wherein, by weight, the water is in an amount of from 25 to 75 parts per 100 parts of powdered cellulose, and mixing the cellulose, flavoring agent and water to provide a mixture in which substantially all of the cellulose is wetted and then heating the mixture to remove most of the water.

11. The product produced by the process of claim 10.

12. A process for treating powdered cellulose consisting essentially of combining powdered cellulose, a flavoring agent, a gelling agent and water, wherein, by weight, the water is in an amount of from 25 to 75 parts per 100 parts of powdered cellulose, and mixing the cellulose, flavoring agent, gelling agent and water to provide a mixture in which substantially all of the cellulose is wetted and then heating the mixture to remove most of the water.

13. The product produced by the process of claim 12.

* * * * *

UNITED STATES PATENT AND TRADEMARK OFFICE
CERTIFICATE OF CORRECTION

PATENT NO. : 4,927,662

DATED : May 22, 1990

INVENTOR(S) : Jau Y. HSU

It is certified that error appears in the above-identified patent and that said Letters Patent is hereby corrected as shown below:

Column 5, line 43, after "also" insert --with--.

Column 6, line 34 (claim 1, line 3) "wate" should be --water--.

Column 6, line 57 (claim 6, line 2) "combinatino" should be --combination--.

Signed and Sealed this

Thirtieth Day of July, 1991

Attest:

*Attesting Officer*

HARRY F. MANBECK, JR.

*Commissioner of Patents and Trademarks*